United States Patent
Kubota et al.

(10) Patent No.: US 7,054,733 B2
(45) Date of Patent: May 30, 2006

(54) ADAPTIVE CRUISE CONTROL SYSTEM FOR VEHICLE

(75) Inventors: Kenta Kubota, Kanagawa (JP); Masanori Kubota, Tochigi (JP); Kenichi Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 14 days.

(21) Appl. No.: 10/366,516

(22) Filed: Feb. 14, 2003

(65) Prior Publication Data

US 2003/0158648 A1 Aug. 21, 2003

(30) Foreign Application Priority Data

| Feb. 18, 2002 | (JP) | ............................. 2002-040638 |
| May 29, 2002 | (JP) | ............................. 2002-155908 |

(51) Int. Cl.
*B60T 7/12* (2006.01)
(52) U.S. Cl. ........................... 701/96; 180/179; 701/93
(58) Field of Classification Search ................ 701/91, 701/93, 95, 96, 300, 301; 340/903, 435, 340/436; 342/69, 70; 180/197, 170, 179; 318/587
See application file for complete search history.

(56) References Cited

U.S. PATENT DOCUMENTS

| 6,370,470 | B1* | 4/2002 | Yamamura et al. ........... 701/96 |
| 6,470,257 | B1* | 10/2002 | Seto ............................. 701/96 |
| 6,679,807 | B1* | 1/2004 | Kato et al. ................... 477/107 |
| 6,687,595 | B1* | 2/2004 | Seto et al. .................... 701/96 |
| 6,792,344 | B1* | 9/2004 | Minowa et al. ............... 701/96 |

FOREIGN PATENT DOCUMENTS

JP 2001-171389 A 6/2001

* cited by examiner

*Primary Examiner*—Richard M. Camby
(74) *Attorney, Agent, or Firm*—Foley & Lardner LLP

(57) ABSTRACT

An adaptive cruise control system for a host vehicle is arranged to calculate a target vehicle speed, to calculate a target driving force based on the target vehicle speed, to limit a rate of increase of the target driving force when a direction of a wheel driving torque applied to driving wheels is changed from a decelerating direction to an accelerating direction, and to control a throttle opening of an engine based on the limited target driving force.

16 Claims, 12 Drawing Sheets

ADAPTIVE CRUISE CONTROL SYSTEM FOR VEHICLE

BACKGROUND OF THE INVENTION

The present invention relates to an adaptive cruise control system which executes a cruise control for maintaining a set vehicle speed and a following control for following a preceding vehicle ahead of the host vehicle while keeping a set inter-vehicle distance.

Japanese Patent Provisional Publication No. 2001-171389 discloses an adaptive cruise control system which is arranged to calculate a target vehicle speed on the basis of an inter-vehicle distance between a host vehicle and a preceding vehicle ahead of the host vehicle and to execute a cruise control on the basis of the target vehicle speed so that the host vehicle travels while following the preceding vehicle.

SUMMARY OF THE INVENTION

However, there is a possibility that the host vehicle employing this earlier technique generates an acceleration shock due to backlash of a driveline when a host-vehicle traveling state is changed from a decelerating state to an accelerating state. Similarly, there is a possibility that the host vehicle employing the earlier technique generates a deceleration shock due to backlash of the driveline when the host-vehicle traveling state is changed from the accelerating state to the decelerating state. These shocks will apply strange drive feeling to a vehicle occupant.

It is therefore an object of the present invention to provide an adaptive cruise control system which suppresses the generation of an acceleration shock and a deceleration shock of a host vehicle so as to prevent a vehicle occupant from having strange feeling during the execution of an adaptive cruise control.

An aspect of the present invention resides in an adaptive cruise control system for a host vehicle which comprises a controller configured to set a target vehicle speed, to set a target driving force on the basis of the target vehicle speed, to control a driving force on the basis of the target driving force, and to limit a magnitude of a rate of change of the target driving force within a predetermined value.

Another aspect of the present invention resides in an adaptive cruise control system for a host vehicle, which comprises a vehicle speed detector for detecting a host-vehicle speed, an inter-vehicle distance detector for detecting an inter-vehicle distance between the host vehicle and a preceding vehicle ahead of the host vehicle, and a controller coupled to the inter-vehicle distance detector and the vehicle speed detector. The controller is configured to calculate a target vehicle speed on the basis of the host vehicle speed and the inter-vehicle distance, to calculate a target driving force on the basis of the target vehicle speed, to control a driving force on the basis of the target driving force, and to limit a magnitude of a rate of change of the target driving force within a first predetermined value.

A further another aspect of the present invention resides in a method of executing an adaptive cruise control system for a host vehicle. The method comprises an operation of setting a target vehicle speed, an operation of setting a target driving force on the basis of the target vehicle speed, an operation of controlling a driving force on the basis of the target driving force, and an operation of limiting a magnitude of a rate of change of the target driving force within a first predetermined value.

The other objects and features of this invention will become understood from the following description with reference to the accompanying drawings.

DETAILED DESCRIPTION OF THE INVENTION

Figure 1:
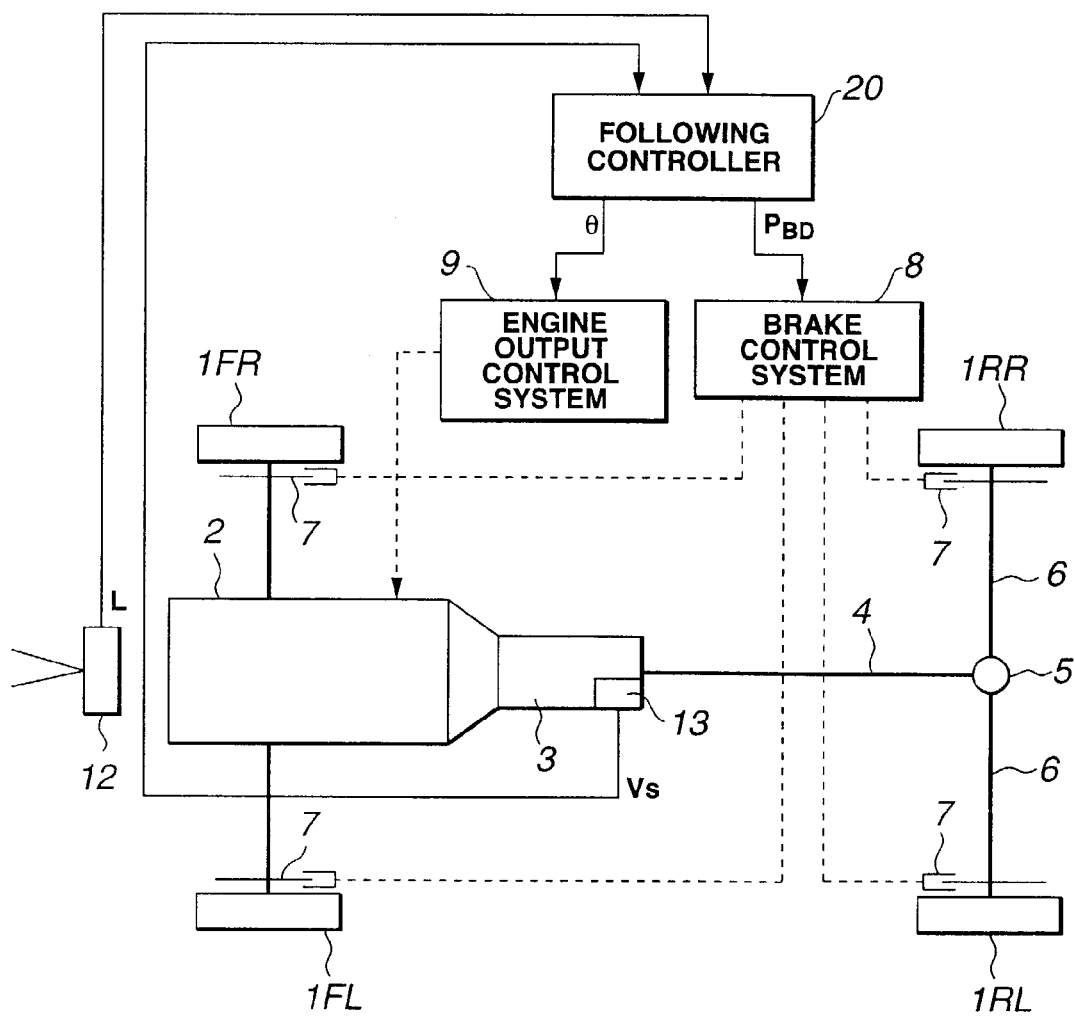
FIG. 1 is a schematic construction view showing a first embodiment of an adaptive cruise control system according to the present invention.
Figure 2:
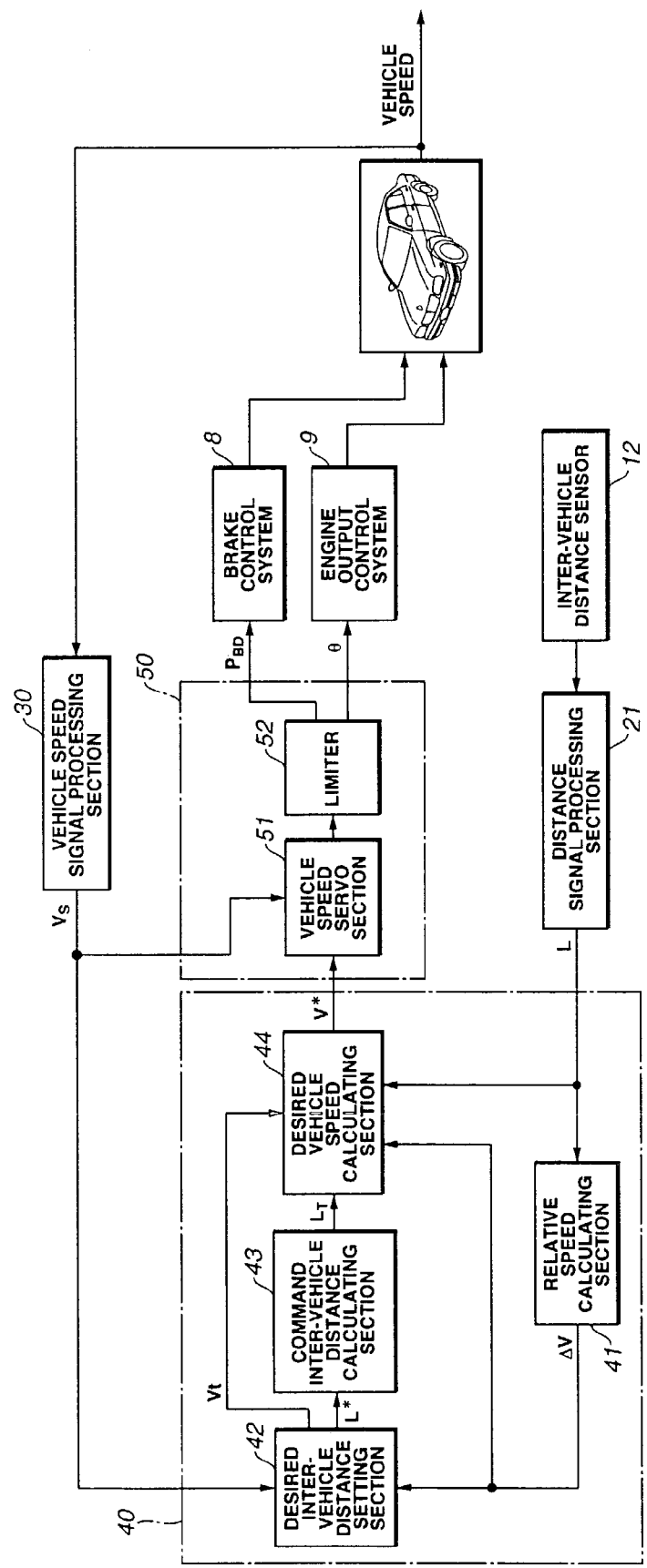
FIG. 2 is a block diagram showing a concrete construction of an adaptive cruise control executed by a following controller of the adaptive cruise control system of FIG. 1.
Figure 3:
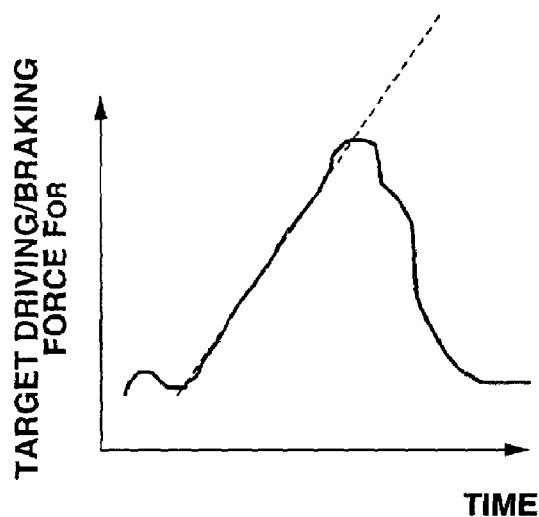
FIG. 3 is a graph showing an operation achieved by the first embodiment.

Referring to FIGS. 1 through 3, there is shown a first embodiment of an adaptive cruise control system according to the present invention.

As shown in FIG. 1, a host vehicle equipped with the adaptive cruise control comprises front wheels 1FL and 1FR acting as driven wheels and rear wheels 1RL and 1RR acting as driving wheels. Rear wheels 1RL and 1RR receive a driving force of an internal combustion engine 2 of the host vehicle through automatic transmission 3, a propeller shaft 4, a final differential gear and an axel 6, and are driven by the transmitted driving force.

Each of front and rear wheels 1FL, 1FR, 1RL and 1RR is provided with a disc brake 7 for generating braking force. A brake control system 8 controls brake hydraulic pressure of each disc brake 7. More specifically, brake control system 8 generates the brake hydraulic pressure according to a depression of a brake pedal (not shown), and generates the brake hydraulic pressure according to a magnitude of a brake pressure command $P_{BD}$ outputted from a following controller 20. Brake control system 8 supplies the brake hydraulic pressure to each of disc brakes 7.

An engine output control system 9 is installed in engine 2 and controls the output of engine 2. Engine output control system 9 controls engine 2 by controlling an opening of a throttle valve (not shown) of engine 2 to control the driving force of engine 2. Engine output control system 9 may be further arranged to control an idling speed of engine 2 by controlling an opening of an idle control valve.

An inter-vehicle distance sensor 12 is attached to a front and lower portion of a vehicle body inter-vehicle distance sensor 12 is constructed by a radar apparatus acting as an inter-vehicle distance detecting means for detecting an inter-vehicle distance L between the host vehicle and a preceding vehicle ahead of the host vehicle. The radar apparatus measures inter-vehicle distance L between the host vehicle and the preceding vehicle by outputting laser beam frontward and by receiving reflection beam reflected by a preceding vehicle ahead of the host vehicle. As inter-vehicle distance sensor 12, a distance sensor for measuring inter-vehicle distance L using radio-waves or ultrasonic waves may be employed.

A vehicle speed sensor 13 for detecting a host-vehicle speed Vs is installed in the host vehicle. Vehicle speed sensor 13 detects host-vehicle speed Vs by detecting a rotation speed of an output shaft of automatic transmission 3.

Following controller 20 receives the signals outputted from inter-vehicle distance sensor 12 and vehicle speed sensor 13. Following controller 20 executes a following control for following a preceding ahead of the host vehicle while maintaining a proper inter-vehicle distance, by controlling brake control system 8 and engine output control system 9 and automatic transmission 3 according to inter-vehicle distance L and host-vehicle speed Vs.

Following controller 20 comprises a microcomputer and peripheral devices, and comprises a control block of FIG. 2 in the form of software.

As shown in FIG. 2, the control block comprises a measured distance signal processing section 21, a vehicle speed signal processing section 30, an inter-vehicle distance control section 40 and a vehicle speed control section 50.

Measured distance signal processing section 21 measures a time period between an outputting moment of outputting the laser beam and a receiving moment of receiving the reflection beam reflected by the preceding vehicle, and calculates inter-vehicle distance L relative to the preceding vehicle ahead of the host vehicle. Vehicle speed signal processing section 30 measures a cycle period of vehicle speed pulses sent from vehicle speed sensor 13. Inter-vehicle distance control section 40 calculates a target vehicle speed V* for maintaining inter-vehicle distance L at a target inter-vehicle distance L* on the basis of inter-vehicle distance L and host-vehicle speed Vs. Vehicle speed control section 50 brings host-vehicle speed Vs closer to target vehicle speed V* by controlling brake control system 8 and engine output control system 9 on the basis of target vehicle speed V* and a relative speed $\Delta V$ which is a difference between host-vehicle speed and the vehicle speed of the preceding vehicle.

Inter-vehicle distance control section 40 comprises a relative speed calculating section 41, a target inter-vehicle distance setting section 42, a command inter-vehicle distance calculating section 43 and a target vehicle speed calculating section 44. Relative speed calculating section 41 calculates relative speed $\Delta V$ relative to the preceding vehicle on the basis of inter-vehicle distance L. Target inter-vehicle distance setting section 42 calculates target inter-vehicle distance L* on the basis of host-vehicle speed Vs and relative speed $\Delta V$. Command Inter-vehicle distance calculating section 43 calculates a command inter-vehicle distance $L_T$ for bringing inter-vehicle distance L closer to target inter-vehicle distance L* from a reference model using a damping coefficient $\zeta$ and a natural frequency $\omega n$, on the basis of relative speed $\Delta V$ and target inter-vehicle distance L*. Target vehicle speed calculating section 44 calculates target vehicle speed V* for bringing inter-vehicle distance L closer to commanded inter-vehicle distance command value $L_T$, on the basis of inter-vehicle distance command value $L_T$.

Relative speed calculating section 41 is constructed by a band-pass filter which executes a band-pass filtering process as to inter-vehicle distance L inputted from measured distance signal processing section 21. This band-pass filter can be represented by a transfer function of the expression (1). Since a numerator of this expression (1) includes a differential term of Laplace operator s, relative speed $\Delta V$ is approximately calculated by substantially differentiating inter-vehicle distance L.

$$F(s) = \omega_C^2 s / (s^2 + 2\zeta_C \omega_C s + \omega_C^2) \qquad (1)$$

where $\omega_C = 2\pi f_C$, s is Laplace operator, and $\zeta_C$ is a damping coefficient. A cutoff frequency $f_c$ is determined from a magnitude of noises of inter-vehicle distance L and a fluctuation tolerance of a fore-and-aft directional acceleration of the host vehicle during a short period. Relative speed $\Delta V$ may be calculated by executing a differential process of inter-vehicle distance L using a high-pass filter for executing a high-pass filtering process of inter-vehicle distance L, instead of employing the band-pass filter.

Target inter-vehicle distance setting section 42 calculates target inter-vehicle distance L* from a preceding vehicle speed $V_t$ obtained by adding host-vehicle speed Vs and relative speed $\Delta V$ ($V_t = V_s + \Delta V$) and a headway time $T_0$ needed for the host vehicle to reach a position $L_0$ [m] back of the present position of the preceding vehicle, using the following expression (2).

$$L^* = V_t \times T_0 + L_S \qquad (2)$$

where $L_S$ is an inter-vehicle distance at a moment that the host vehicle is stopping. By employing a concept of the time gap, inter-vehicle is set at a value which increases as the host-vehicle speed increases.

Command inter-vehicle distance calculating section 43 calculates command inter-vehicle distance $L_T$ for executing the following traveling to the preceding vehicle while bringing inter-vehicle distance L closer to target inter-vehicle L*. More specifically, command inter-vehicle distance $L_T$ is calculated by executing a filtering process of a second-order lag with respect to target inter-vehicle L*. This second-order lag filtering process is executed by employing a reference model $G_T(s)$ expressed by the following expression (3), using a damping coefficient $\zeta$ and a natural frequency $\omega_n$ determined for setting a response characteristic in the inter-vehicle distance control system at a target response characteristic.

$$G_T(s) = \frac{\omega_n^2}{s^2 + 2\zeta\omega_n s + \omega_n} \quad (3)$$

Target inter-vehicle distance calculating section 44 calculates target inter-vehicle distance L* on the basis of command inter-vehicle distance $L_T$, using a feedback compensator. More specifically, target inter-vehicle distance L* is calculated by subtracting a linear combination of a product of a difference $(L_T-L)$ and a distance control gain fd and a product of the relative speed $\Delta V$ and a speed control gain fv as expressed by the following expression (4).

$$V^* = Vt - \{fd(L_T-L) + fv \cdot \Delta V\} \quad (4)$$

Vehicle speed control section 50 controls throttle opening $\theta$ through engine output control system 9 for controlling a driving torque of engine 2, the shift position through the transmission control unit of automatic transmission 3 and the brake pressure command value $P_{BD}$ through the brake control system 8 on the basis of target driving/braking force $F_{OR}$ by setting target driving/braking force $F_{OR}$ so as to bring host-vehicle speed $V_S$ closer to target vehicle speed V*. That is, vehicle speed control section 50 comprises a vehicle speed servo section 51 and a limiter 52, as shown in FIG. 2. Vehicle speed servo section 51 calculates a target acceleration/deceleration $\alpha 1$ and a disturbance estimate $\alpha 2$ which are employed for bringing host-vehicle speed $V_S$ closer to target vehicle speed V*, and calculates target driving/braking force $F_{OR}$ by multiplying a vehicle mass M and a deviation between target acceleration/deceleration $\alpha 1$ and disturbance estimate $\alpha 2$. Limiter 52 limits a rate of increase of target driving/braking force $F_{OR}$ to be smaller than a predetermined value such as a value within a range from 100 to 230 Nm/sec.

Subsequently, there will be discussed the operation of the adaptive cruise control system of the first embodiment according to the present invention.

When the traveling state of the host vehicle is put in a slow deceleration state from a constant speed following state, for example, for the reason that a vehicle cuts in a traveling lane ahead of the host vehicle when the host vehicle follows another preceding vehicle at a constant speed, inter-vehicle distance L is slowly decreased to take a small value as compared with target inter-vehicle distance L*. Accordingly, target vehicle speed V calculated at target vehicle speed calculating section 44 of inter-vehicle distance control section 40 is slowly decreased, and target driving/braking force $F_{OR}$ calculated at vehicle speed servo section 51 takes a negative value. That is, a rate of increase of target driving/braking force $F_{OR}$ is smaller than the predetermined value, and therefore limiter 52 does not operate. Consequently, throttle opening $\theta$ is controlled at a full closed state, and brake pressure command value $P_{BD}$ calculated at vehicle speed control section 50 is controlled so as to bring host-vehicle speed $V_S$ closer to target vehicle speed V*.

Thereafter, when inter-vehicle distance L becomes large as compared with target inter-vehicle distance L*, for example, for the reason that a preceding vehicle moves from the traveling lane same as that of the host vehicle to another lane, target vehicle speed V* is radically increased. Accordingly, target driving/braking force $F_{OR}$ stands to take a large positive value. However, since limiter 52 operates to limit the rate of increase of target driving/braking force $F_{OR}$ within the predetermined value, target driving/braking force $F_{OR}$ in this situation is limited by limiter 52. Therefore, throttle opening $\theta$ is controlled according to the limited target driving/braking force $F_{OR}$. Further, brake pressure command value $P_{BD}$ is set at almost zero, and therefore brake control system 8 puts each disc brake 7 in an inoperative state.

With the thus arranged first embodiment according to the present invention, the adaptive cruise control system limits the rate of increase of target driving/braking force $F_{OR}$ to be smaller than or equal to the predetermined value and to control throttle opening $\theta$ according to the limited target driving/braking force $F_{OR}$ when the driving wheel torque applied to rear wheels 1RL and 1RR acting as driving wheels changes from a negative value to a positive value, that is, when the direction of the driving force is changed from a decelerating direction for decreasing the rotation speed of the driving wheels to an accelerating direction for increasing the rotation speed of the driving wheels.

This arrangement according to the first embodiment according to the present invention suppresses an acceleration shock due to backlash of a driveline of the host-vehicle, and prevents a vehicle occupant from having a strange feeling in behavior of the host vehicle.

Figure 22:
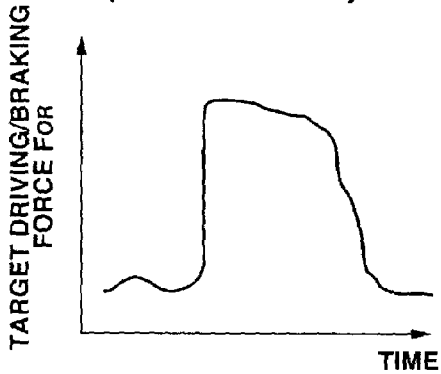
FIG. 22 is a graph showing an operation of an earlier art of the adaptive cruise control system.

In contrast to this, if following controller 20 does not comprises limiter 52, the vehicle will generates an acceleration shock due to the backlash of the driveline of the vehicle as shown in FIG. 22, and a vehicle occupant will feel strange feeling from the acceleration shock.

Figure 4:
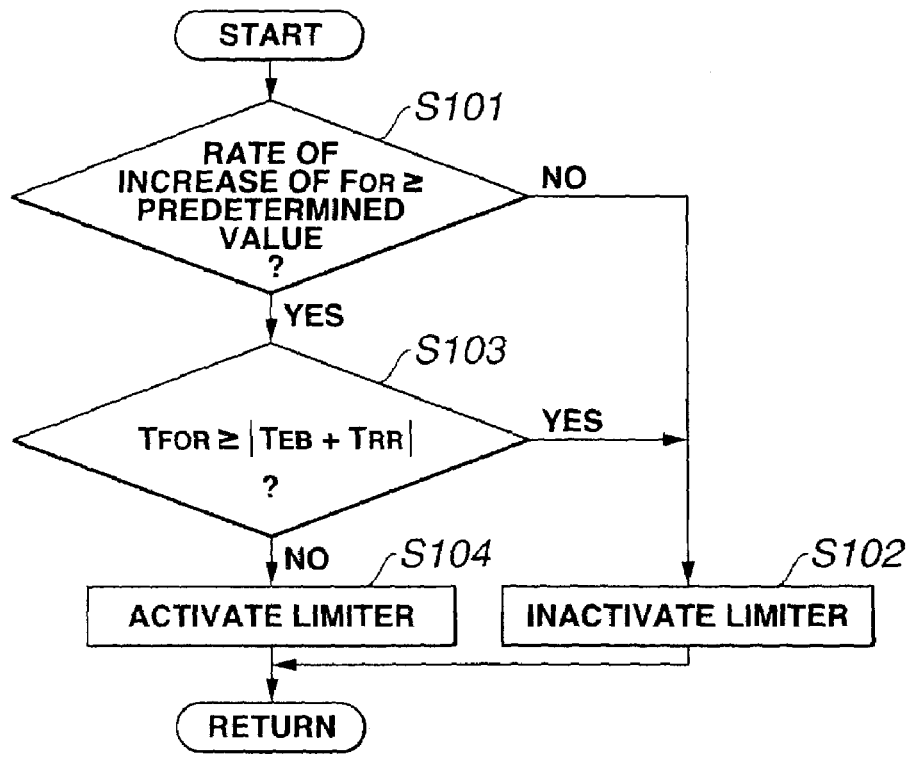
FIG. 4 is a flowchart showing a limiter state set processing in a vehicle speed control processing executed by the following controller of a second embodiment.

Referring to FIGS. 4 to 7, there is shown a second embodiment of the adaptive cruise control system according to the present invention. The construction of the adaptive cruise control system of the second embodiment is basically the same as that of the first embodiment except that the adaptive cruise control system of the second embodiment further comprises a program executed at limiter 52. This program is, as shown in FIG. 4, a limiter state set processing of a vehicle speed control processing and is a timer interruption routine executed at predetermined sampling periods such as 10 msec relative to a main program of the adaptive cruise control system.

At step S101 of the program shown in FIG. 4, controller 20 determines whether or not an increase rate of target driving/braking force $F_{OR}$ is greater than or equal to the predetermined value. When the determination at step S101 is affirmative, the program proceeds to step S103. When the determination at step S101 is negative, the program proceeds to step S102.

At step S102 controller 20 controls throttle opening $\theta$ on the basis of target driving/braking force $F_{OR}$ calculated at vehicle speed servo section 51 under a condition that limiter 52 is inactive. The control of throttle opening $\theta$ corresponds to a control of an actual driving force of engine 2 of the host vehicle. Thereafter, the program returns to the predetermined main program.

At step S103 controller 20 determines whether or not a driving wheel torque $T_{FOR}$ due to target driving/braking force $F_{OR}$ calculated at vehicle speed servo section 51 is greater than or equal to an absolute value of a total of a driving wheel torque $T_{EB}$ generated by the engine brake and a driving wheel torque $T_{RR}$ due to a running resistance. That is, the engine brake and the running resistance generate a negative torque for decelerating the vehicle, and therefore, by comparing the driving torque due to the target driving/braking force $F_{OR}$ and an absolute value of a total of the driving wheel torque due to the engine brake and the driving wheel torque duet the running resistance, it is determined whether the host vehicle is in an accelerating state (affirmative determination) or a decelerating state (negative determination). When the determination at step S103 is affirmative, that is, when the target driving/braking force $F_{OR}$ is greater than or equal to the total, the program proceeds to step S102. When the determination at step S103 is negative, the program proceeds to step S104.

Figure 5:
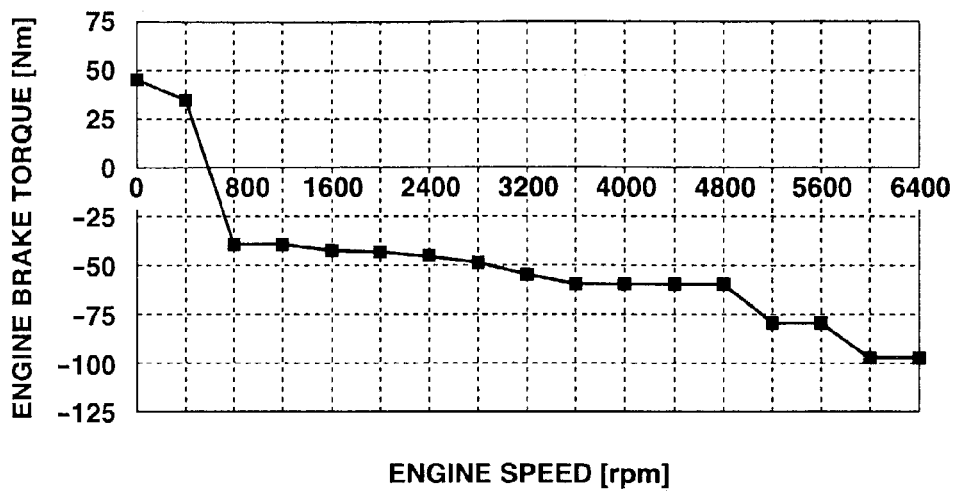
FIG. 5 is a graph showing a data map showing a relationship between an engine speed and an engine brake torque.
Figure 6:
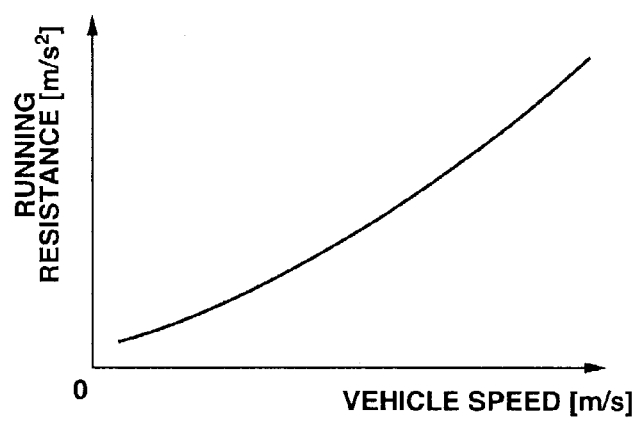
FIG. 6 is a graph showing a relationship between the vehicle speed and a running resistance of the host vehicle.

The driving wheel torque $T_{EB}$ due to engine brake is calculated on the basis of the engine speed with reference to a previously stored data-map shown in FIG. 5, and the driving wheel torque $T_{RR}$ due to the running resistance is calculated on the basis of host-vehicle speed Vs with reference to a previously stored data-map shown in FIG. 6.

At step S104 controller 20 activates limiter 52. That is, controller 20 limits the rate of increase of target driving/braking force $F_{OR}$ calculated at vehicle speed servo section 50 to be smaller than or equal to the predetermined value. Further, controller 20 controls throttle opening θ on the basis of the limited target driving/braking force $F_{OR}$. Thereafter, the processing of controller 20 returns to the predetermined main program.

According to the second embodiment of the adaptive cruise control system according to the present invention, in the event that inter-vehicle distance L becomes large under a vehicle decelerating condition as in a case that a preceding vehicle ahead of the host vehicle decelerates and changes a traveling lane to other lane, the limiter state set processing of FIG. 4 makes the affirmative determination at step S101, and makes the negative determination at step S103. Therefore, at step S103 controller 20 limits the rate of increase of target driving/braking force $F_{OR}$ to be smaller than or equal to the predetermined value. Therefore, throttle opening θ is controlled on the basis of the limited target driving/braking force $F_{OR}$.

Figure 7:
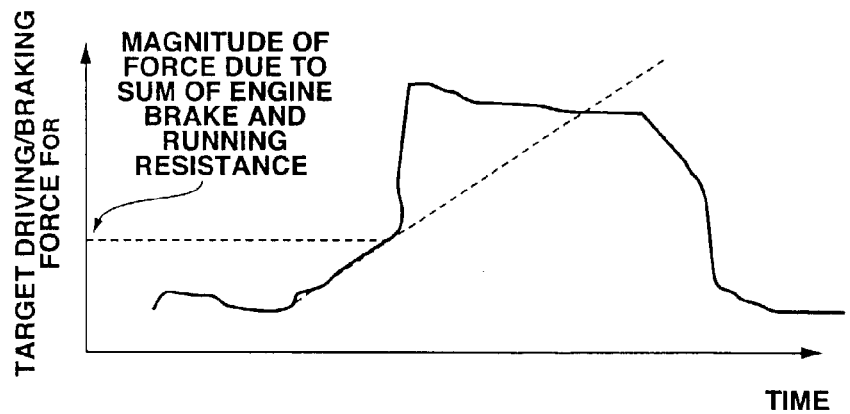
FIG. 7 is a graph showing an operation executed in the second embodiment.

Thereafter, in the event that the vehicle 10 traveling state is changed from a decelerating state to the accelerating state due to the increase of target driving/braking force $F_{OR}$, the driving wheel torque $T_{FOR}$ due to target driving/braking force $F_{OR}$ becomes greater than the total of the driving wheel torque $T_{EB}$ due to engine brake and the driving wheel torque $T_{RR}$ due to the running resistance. Therefore, the affirmative determination is made at step S103 of the vehicle speed control processing, and controller 20 inactivates limiter 52 at step S102 so as to cancel a limitation as to the rate of increase of target driving/braking force $F_{OR}$. Consequently, throttle opening θ is controlled on the basis of the non-limited target driving/braking force $F_{OR}$ under the accelerating state as shown in FIG. 7.

With the thus arranged second embodiment according to the present invention, when the driving wheel torque due to the target driving/braking force $F_{OR}$ is greater than or equal to the total of the driving wheel torque due to engine brake and the driving wheel torque due to the running resistance, the limitation to target driving/braking force $F_{OR}$ is cancelled. Therefore, when the vehicle traveling state changed from the deceleration state to the acceleration state, an acceleration shock due to backlash of the driveline is suppressed, and a slow down of acceleration in the acceleration state is avoided. This prevents the vehicle occupant to have strange feeling in driving.

Figure 8:
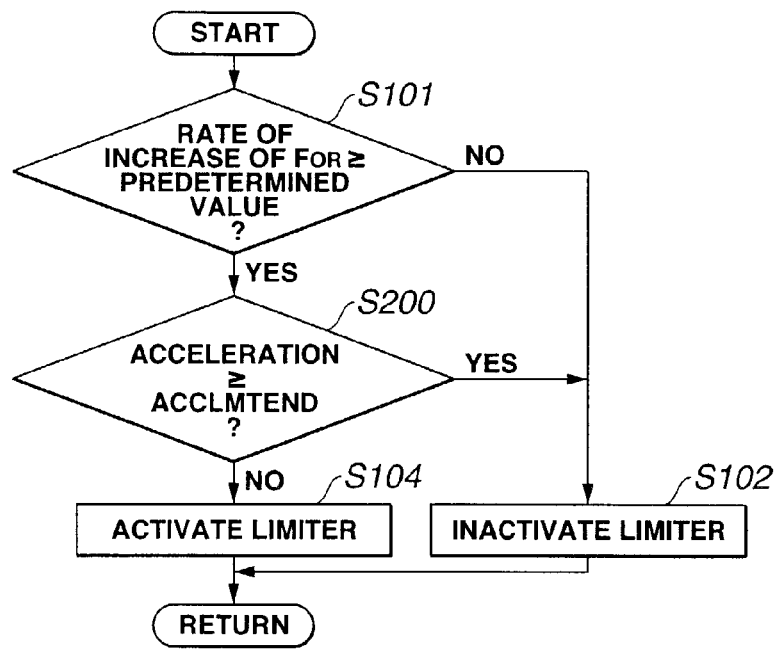
FIG. 8 is a flowchart showing the limiter state set processing in the vehicle speed control processing executed by the following controller of a third embodiment.
Figure 9:
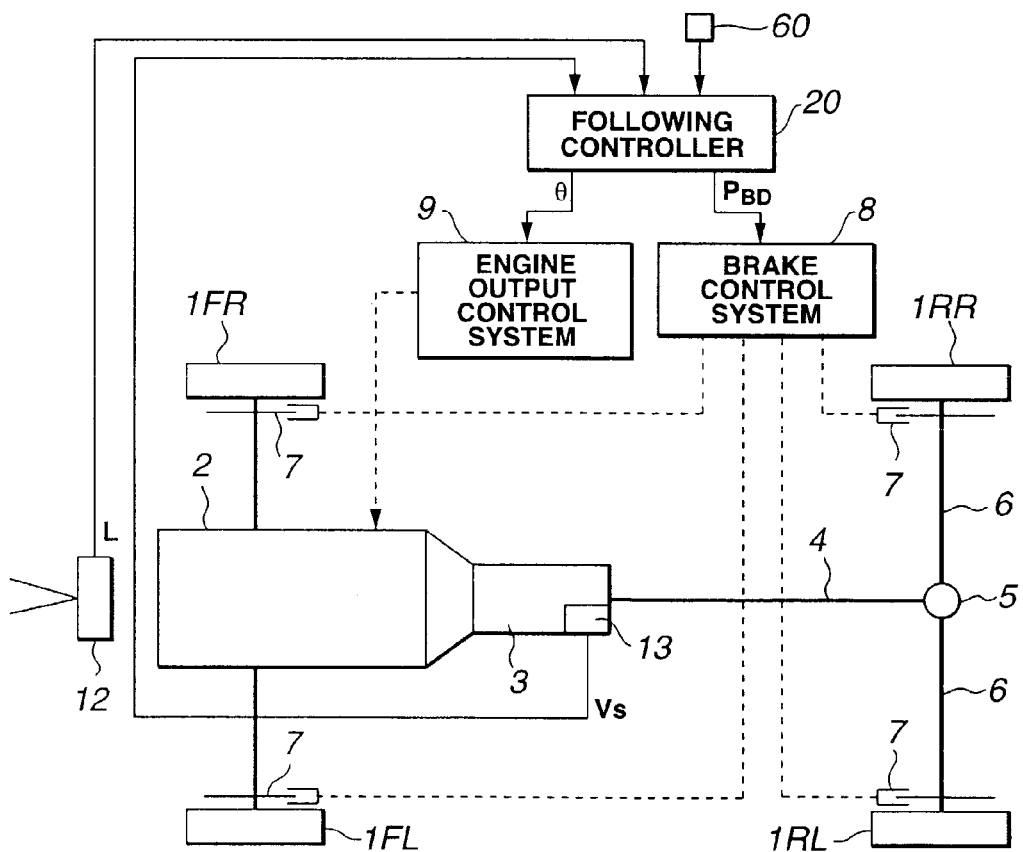
FIG. 9 is a schematic construction view showing the third embodiment of the adaptive cruise control system according to the present invention.
Figure 10:
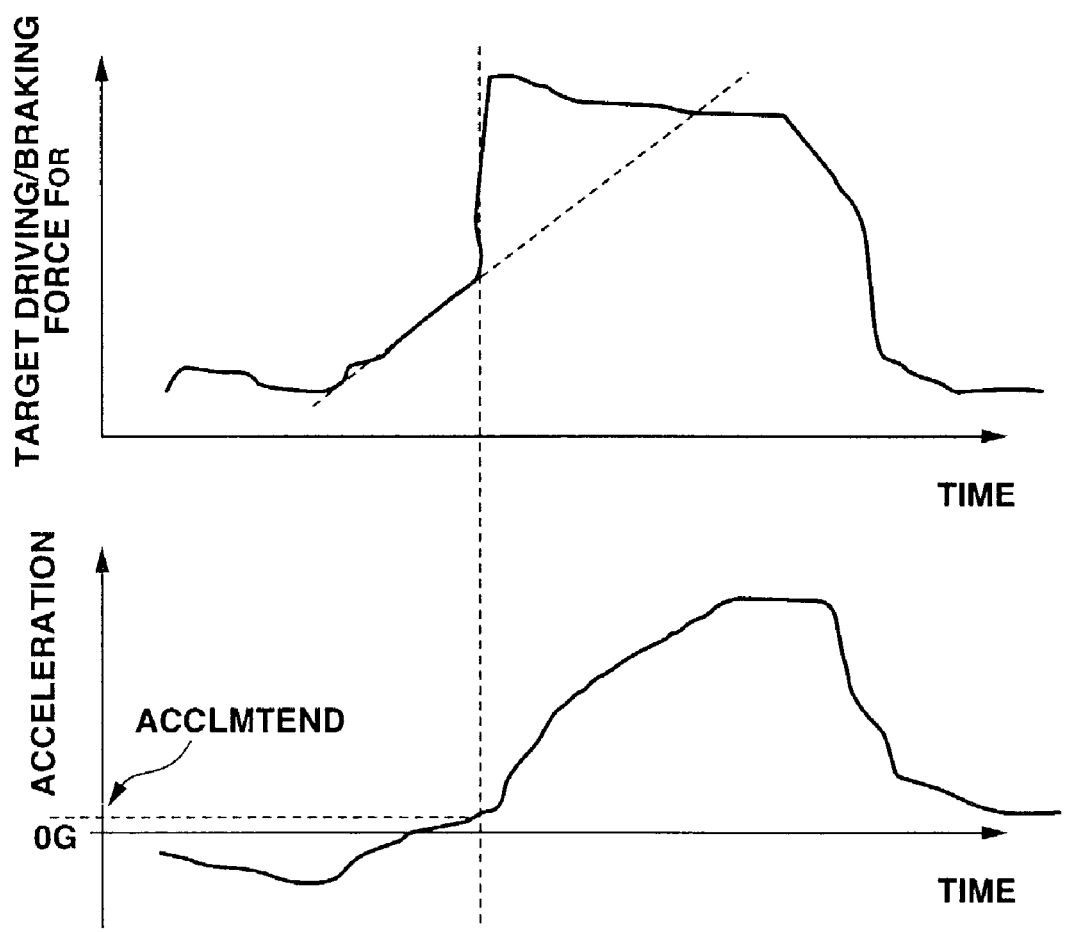
FIG. 10 is a graph showing an operation achieved by the third embodiment.
Figure 11:
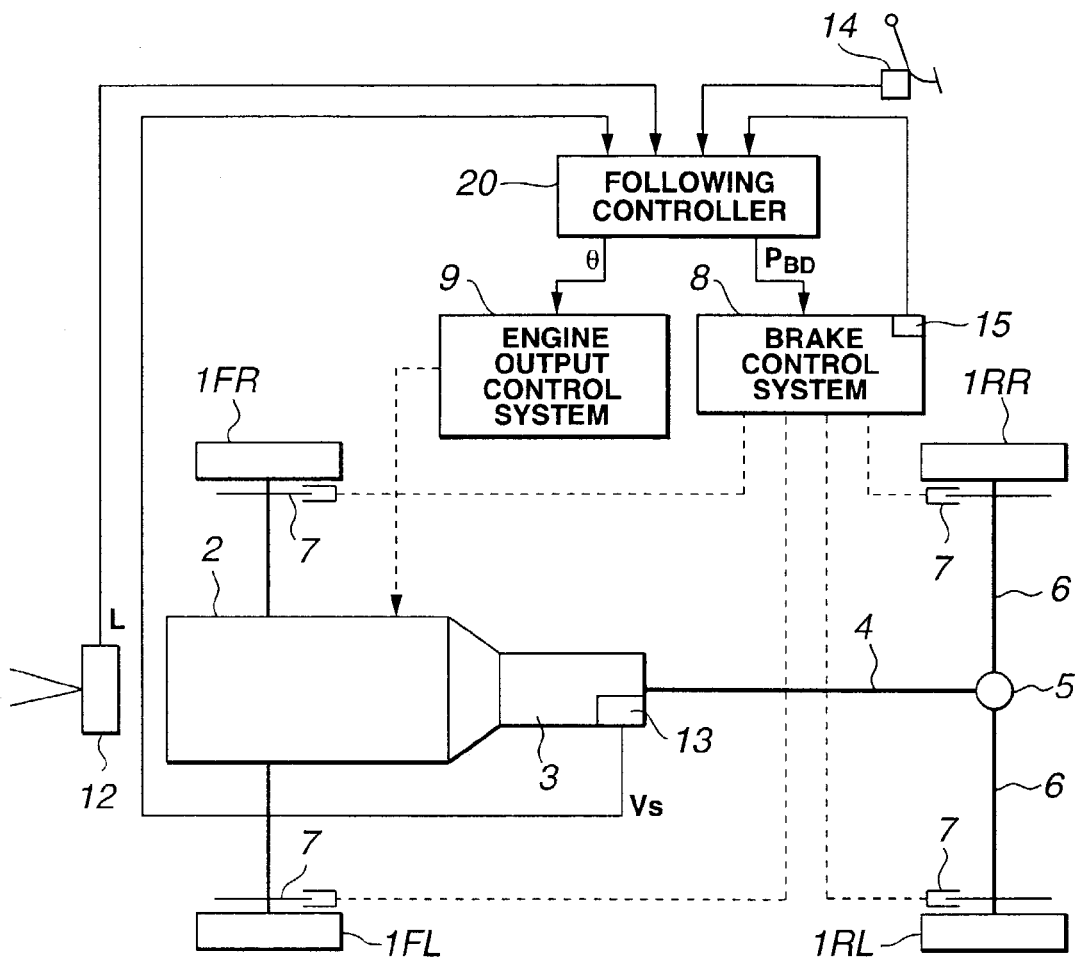
FIG. 11 is a schematic construction view showing a fourth embodiment of the adaptive cruise control system according to the present invention.

Referring to FIGS. 8 through 10, there will be discussed a third embodiment of the adaptive cruise control system according to the present invention.

The third embodiment according to the present invention is specifically arranged to increase the acceleration performance of the vehicle when the acceleration of the vehicle becomes greater than a predetermined value under the vehicle accelerating condition.

More specifically, the adaptive cruise control system of the third embodiment comprises an acceleration sensor 60 for detecting an acceleration Acc of the host vehicle as shown in FIG. 9, and employs the limiter state set processing shown in FIG. 8, which is executed at limiter 52 of controller 20. The limiter state set processing in the flowchart of FIG. 8 newly employs step S200 instead of step S103 employed in the flowchart of FIG. 4 of the second embodiment.

In the processing of the flowchart of FIG. 9, at step S200 subsequent to the affirmative determination at step S101, controller 20 determines whether or not the acceleration Acc detected by acceleration sensor 60 is greater than or equal to a value ACCLMTEND such as a value within a range from 0 to 0.02G. When the determination at step S200 is affirmative, the program proceeds to step S102. When the determination at step S200 is negative, the program proceeds to step S104. Other steps S101, S103 and S104 in FIG. 8 of the third embodiment are basically the same as those of the second embodiment. Therefore, the explanation thereof is omitted herein.

With the thus arranged third embodiment according to the present invention, when the acceleration Acc of the vehicle is greater than predetermined value ACCLMTEND, controller 20 inactivates limiter 53 so that the limitation of target driving/braking force $F_{OR}$ is cancelled as shown in FIG. 10. Therefore, an acceleration shock due to backlash of the driveline is suppressed when the vehicle traveling state changes from the decelerating state to the acceleration state, and a slow down of the vehicle acceleration in the acceleration state is also avoided. This prevents the vehicle occupant to have strange feeling in driving the host vehicle.

Referring to FIGS. 11 through 23, there will be discussed a fourth embodiment of the adaptive cruise control system according to the present invention.

The fourth embodiment according to the present invention is specifically arranged to limit a magnitude of a rate of decrease of target driving/braking force $F_{OR}$ to be smaller than or equal to a predetermined magnitude so as to suppress the deceleration shock due to backlash of the driveline when the vehicle traveling state changes from the accelerating state to the decelerating state.

More specifically, the adaptive cruise control system of the fourth embodiment comprises a brake pedal stroke sensor 14 for detecting a stroke quantity BSTQ of a brake pedal and a brake hydraulic pressure sensor 15 for detecting a brake hydraulic pressure $P_{HYD}$ generated by brake control system 8 according to a braking operation of a vehicle occupant. Further, the adaptive cruise control system of the fourth embodiment employs the limiter state set processing shown in FIG. 12, which is executed by limiter 52 of controller 20, instead the flowchart of FIG. 4 employed in the second embodiment. Limiter 52 is basically arranged to limit the magnitude of the rate of decrease of target driving/braking force $F_{OR}$ when a limiter cancel flag $FG_{CF}$ is reset ($F_{GCF}=0$).

At step S301 in the limiter state set processing shown in FIG. 12, controller 20 determines whether or not a limiter cancel flag $FG_{LC}$ is set at 1 in a limiter cancel flag set processing, which will be discussed later. When the determination at step S301 is affirmative ($FG_{LC}=1$), the program proceeds to step S302. When the determination at step is negative ($FG_{LC}=0$), At step S302 subsequent to the affirmative determination at step S301, controller 20 inactivates limiter 52 and controls throttle opening θ on the basis of target driving/braking force $F_{OR}$ under a non-limited condition that the rate of decrease of target driving/braking force $F_{OR}$ is not limited by limiter 52. Thereafter, the program returns to a predetermined main program.

At step S303 controller 20 activates limiter 52, and therefore limits a rate of decrease of target driving/braking force $F_{OR}$ so that the magnitude of rate of decrease of target driving/braking force $F_{OR}$ is smaller than or equal to the predetermined magnitude. Further, controller 20 controls throttle opening θ on the basis of the limited target driving/braking force $F_{OR}$ under a limited condition that limiter 52 limits the rate of decrease of target driving/braking force $F_{OR}$. Thereafter, the processing of controller 20 returns to the predetermined main program.

Subsequently, there will be discussed the limiter cancel flag set processing for setting limiter cancel flag $FG_{LC}$ with reference to a flowchart of FIG. 13. As is clear from the flowchart of FIG. 12, when limiter cancel flag $FG_{LC}$ is set at 1 ($FG_{LC}=1$), limiter 52 is put in inactive state at step S302, and when $FG_{LC}=0$, limiter 52 is put in active state at step S303. This processing is a timer interruption processing executed at a predetermined interval ΔT such as 10 msec.

Figure 13:
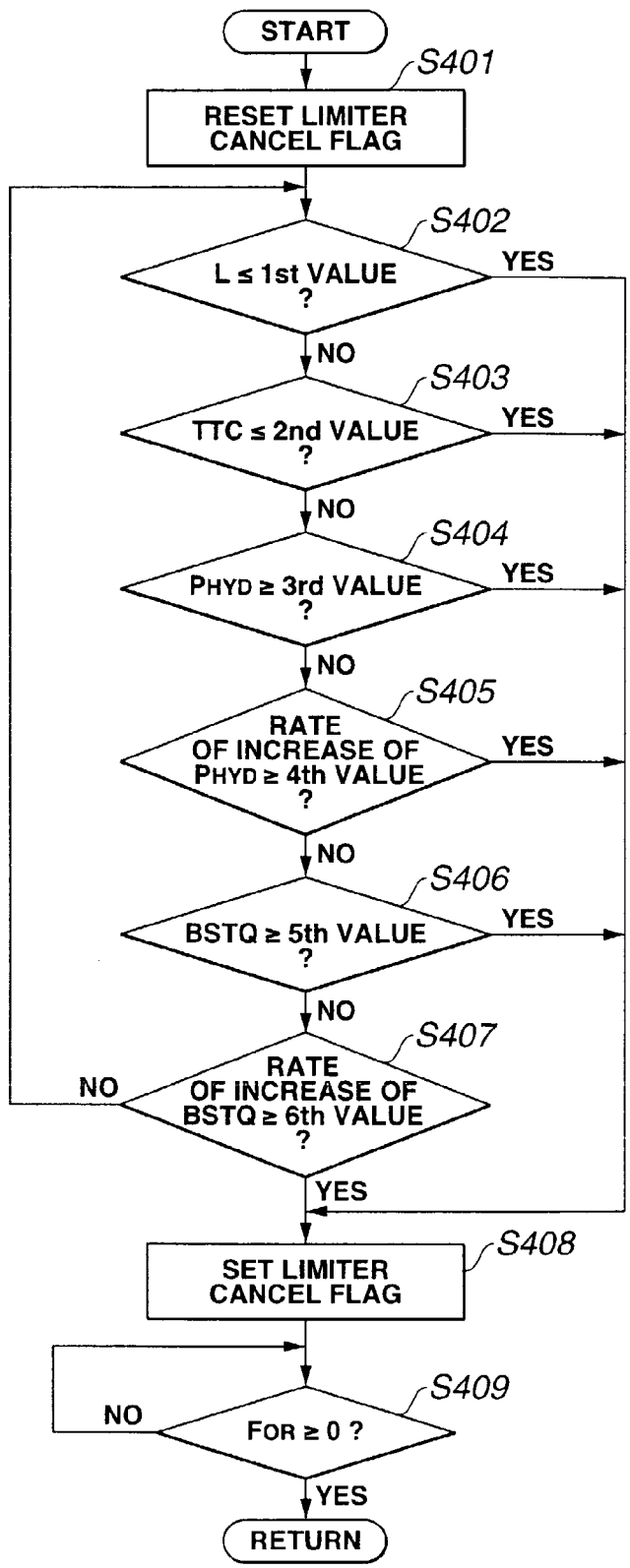
FIG. 13 is a flowchart showing a limiter cancel flag set processing of the fourth embodiment.

At step S401 in the flowchart of FIG. 13, controller 20 resets limiter cancel flag $FG_{LC}$ ($FG_{LC}=0$).

At step S402 controller 20 determines whether or not inter-vehicle distance L detected by inter-vehicle distance sensor 12 is smaller than or equal to a first value such as 20 m. When the determination at step S402 is affirmative, the program proceeds to step S408. When the determination at step S402 is negative, the program proceeds to step S403.

At step S403 controller 20 calculates a collision prediction time TTC which is a time period needed for contacting the host vehicle with the preceding vehicle ahead of the host vehicle. More specifically, controller 20 calculates an approach speed by multiplying relative speed ΔV and −1, and calculates collision prediction time TTC by dividing inter-vehicle distance L by the calculated approach speed −ΔV. Further, controller 20 calculates whether or not collision prediction time TTC is smaller than or equal to a second value. When the determination at step S403 is affirmative, the program proceeds to step S408. When the determination at step S403 is negative, the program proceeds to step S404.

At step S404 controller 20 determines whether or not brake hydraulic pressure $P_{HYD}$ detected by brake hydraulic pressure sensor 15 is greater than or equal to a third value. When the determination at step S404 is affirmative, the program proceeds to step S408. When the determination at step S404 is negative, the program proceeds to step S405.

At step S405 controller 20 determines whether or not a rate of increase of brake hydraulic pressure $P_{HYD}$ is greater than or equal to a fourth value. When the determination at step S405 is affirmative, the program proceeds to step S408. When the determination at step S405 is negative, the program proceeds to step S406.

At step S406 controller 20 determines whether or not stroke quantity BSTQ detected by the brake pedal stroke sensor 14 is greater than or equal to a fifth value. When the determination at step S406 is affirmative, the program proceeds to step S408. When the determination at step S406 is negative, the program proceeds to step S407.

At step S407 controller 20 determines whether or not a rate of increase of stroke quantity BSTQ is greater than or equal to a sixth value. When the determination at step S407 is affirmative, the program proceeds to step S408. When the determination at step S407 is negative, the program returns to step S402.

At step S408 controller 20 sets limiter cancel flag $FG_{LC}$ at 1 ($FG_{LC}=1$).

At step S409 subsequent to the execution of step S408, controller 20 determines whether or not target driving/braking force $F_{OR}$ is greater than or equal to zero. When the determination at step S409 is affirmative ($F_{OR} \geq 0$), the program proceeds to a return block to terminate the present processing. When the determination at step S409 is negative, step S409 repeatedly executed until the affirmative determination is made at step S409.

According to the fourth embodiment according to the present invention, in the event that inter-vehicle distance L is decreased within a range greater than the first value when the host vehicle is accelerating, such as, in the event that a vehicle cuts in a traveling lane ahead of the host vehicle from another lane while having inter-vehicle distance L greater than the first value when the host vehicle is accelerating, at step S401 in the limiter cancel flag set processing of FIG. 13, limiter cancel flag $FG_{LC}$ is reset ($FG_{LC}=0$), and the negative determination is made at each of steps S402 through S407, as far as the adaptive cruise control is continued and there is no special operation corresponding to the affirmative determination at one of steps S402 through S407. Therefore, the steps S402 through S408 are repeatedly executed.

Figure 12:
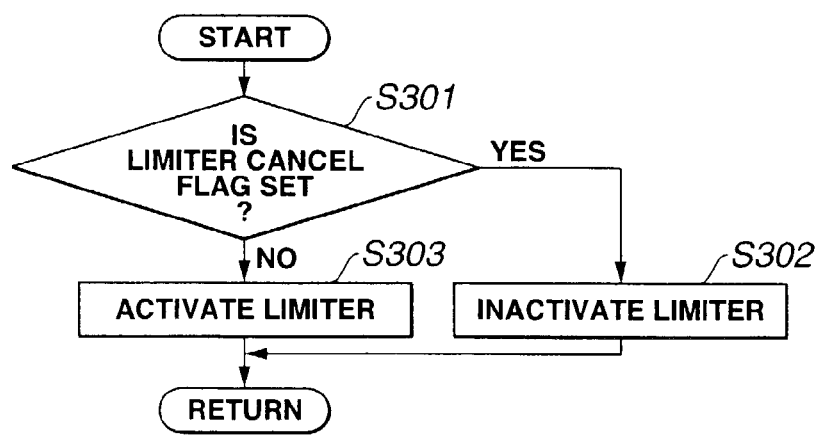
FIG. 12 is a flowchart showing the limiter state set processing in the vehicle speed control processing executed by the following controller of the fourth embodiment.

Since limiter cancel flag $FG_{LC}$ is put in the reset state ($FG_{LC=0}$), the negative determination is made at step S301 in the limiter state set processing of FIG. 12. Therefore, at step S303 the magnitude of the rate of decrease of target driving/braking force $F_{OR}$ is limited to be smaller than the predetermined magnitude, and throttle opening θ is controlled on the basis of the limited target driving/braking force $F_{OR}$.

Figure 14:
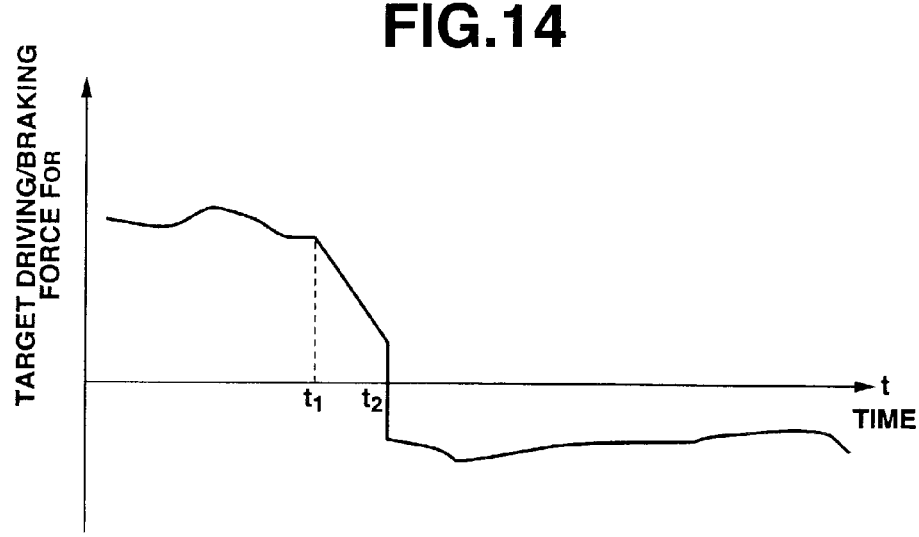
FIG. 14 is a graph showing an operation achieved by the fourth embodiment.

Thus, according to the fourth embodiment according to the present invention, when the driving wheel torque applied to rear wheels 1RL and 1RR acting as driving wheels is changed from a positive value to a negative value, that is, when the direction of the driving wheel torque is changed from a vehicle accelerating direction to a vehicle decelerating direction, the magnitude of the rate of decrease of target driving/braking force $F_{OR}$ is limited to be smaller than the predetermined magnitude, and throttle opening θ is controlled on the basis of the limited target driving/braking force $F_{OR}$. As shown in FIG. 14, when controller 20 resets limiter cancel flag $FG_{LC}$ at time t1, this limited operation is executed during a period from time t1 to time t2. Accordingly, the arrangement of the fourth embodiment suppresses a deceleration shock due to backlash of the driveline, and prevents a vehicle occupant from having strange feeling during this operation.

Figure 23:
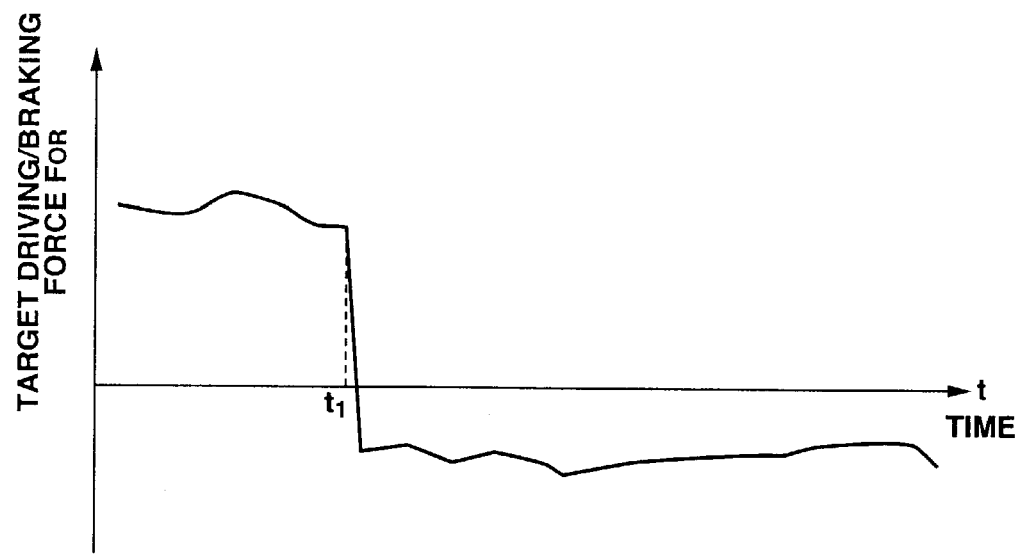
FIG. 23 is a graph showing an operation of an earlier art of the adaptive cruise control system.

In contrast, if following controller 20 of the adaptive control system does not comprise limiter 52 discussed in the fourth embodiment or if following controller 20 does not execute the programs shown in FIGS. 12 and 13, a deceleration shock due to backlash of the driveline is generated as shown in FIG. 23 when the vehicle traveling state is changed from the accelerating state to the decelerating state. The host vehicle will generate a deceleration shock and apply strange feeling to the vehicle occupant.

Figure 15:
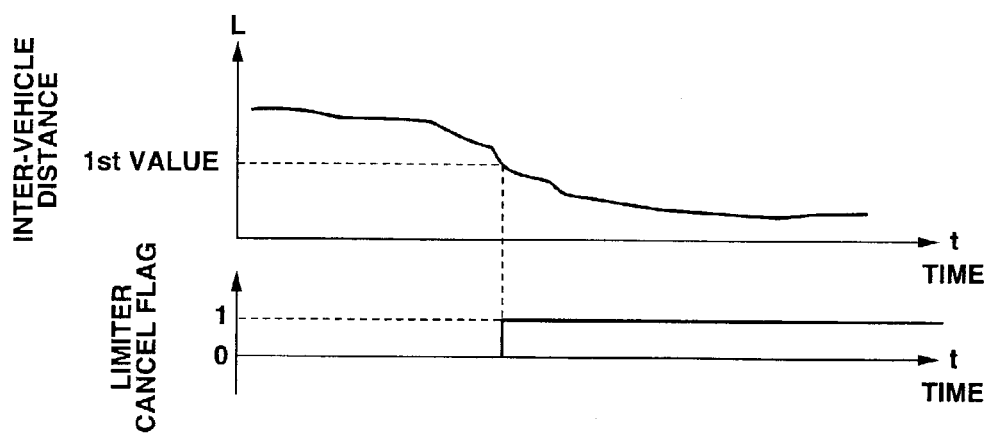
FIG. 15 is a graph showing an operation achieved according to an affirmative determination at step S402 in the flowchart of FIG. 13.

Thereafter, according to the arrangement of the fourth embodiment according to the present invention, when inter-vehicle distance L becomes smaller than the first value such as 20 m, the affirmative determination is made at step S402. Accordingly, the program proceeds from step S402 to step S408 wherein limiter cancel flag $FG_{LC}$ is set ($FG_{LC}=1$) as shown in FIG. 15. Simultaneously, the affirmative determination is made at step S301 in the program shown in FIG. 12, and limiter 52 is put in the inactive state at step S302 so that the limitation as to the magnitude of the rate of decrease of target driving/braking force $F_{OR}$ is cancelled. Therefore, throttle opening θ is controlled on the basis of the non-limited target driving/braking force $F_{OR}$. This non-limited operation corresponds to the operation after time t2 in FIG. 14.

With the thus arranged fourth embodiment according to the present invention, when inter-vehicle distance L is smaller than or equal to the first value such as 20 m and when the host-vehicle is approaching a preceding vehicle ahead of the host vehicle, the limitation as to target driving/braking force $F_{OR}$ is cancelled. Therefore, the host vehicle is smoothly decelerated without any limitation, and ensures a safety driving performance.

Figure 16:
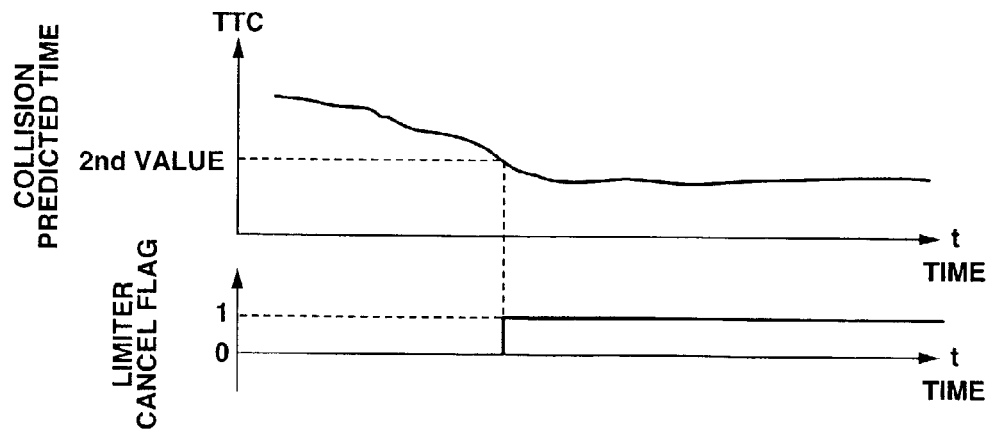
FIG. 16 is a graph showing an operation achieved according to an affirmative determination at step S403 in the flowchart of FIG. 13.

Further, when inter-vehicle distance is greater than the first value such as 20 m and when collision prediction time TTC is smaller than or equal to the second value, for example, for the reason that the approaching speed to the preceding vehicle increases due to the deceleration of the preceding vehicle, step S402 in the limiter cancel flag set processing shown in FIG. 3 makes the negative determination, and step S403 makes the affirmative determination. Therefore, the program in FIG. 13 proceeds from step S403 to step S408 wherein limiter cancel flag $FG_{LC}$ is set at 1 ($FG_{LC}=1$) as shown in FIG. 16. With this arrangement of the fourth embodiment according to the present invention, when collision prediction time TTC is smaller than or equal to the second value and when the host-vehicle is approaching a preceding vehicle ahead of the host vehicle with a high degree of approach tendency, the limitation for limiting the magnitude of the rate of decrease of target driving/braking force $F_{OR}$ is cancelled. Therefore, the host vehicle is smoothly decelerated without any limitation, and ensures a safety driving performance.

Figure 17:
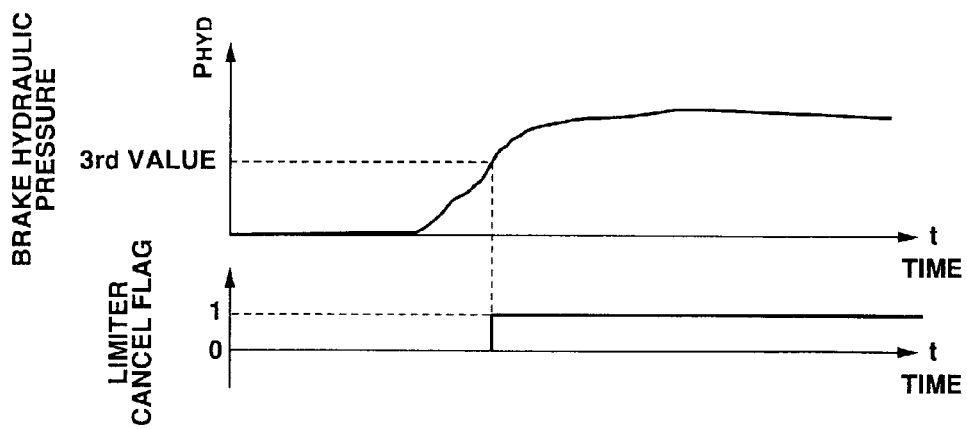
FIG. 17 is a graph showing an operation achieved according to an affirmative determination at step S404 in the flowchart of FIG. 13.
Figure 18:
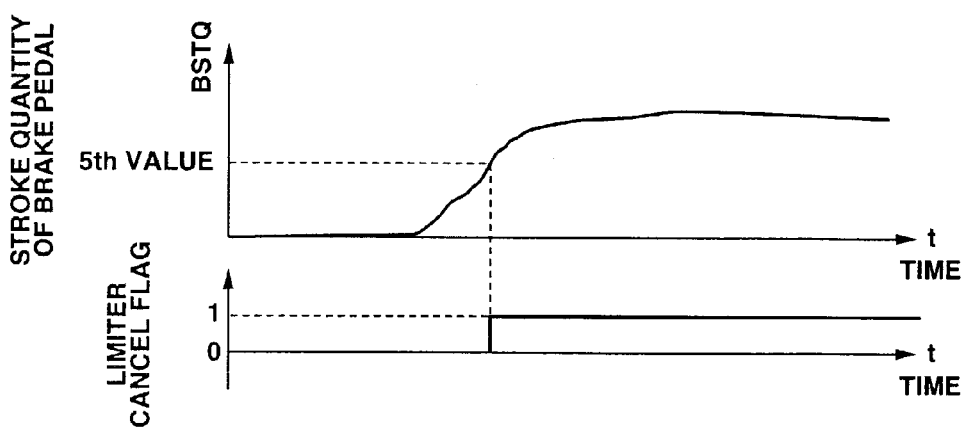
FIG. 18 is a graph showing an operation achieved according to an affirmative determination at step S406 in the flowchart of FIG. 13.

On the other hand, when a brake hydraulic pressure $P_{HYD}$ generated by brake control system 8 according to the braking operation of the vehicle occupant is greater than the third value, step S404 in the limiter cancel flag set processing shown in FIG. 3 makes the affirmative determination. Therefore, the program in FIG. 13 proceeds from step S404 to step S408 wherein limiter cancel flag $FG_{LC}$ is set at 1 ($FG_{LC}=1$) as shown in FIG. 17. Similarly, when stroke quantity BSTQ of the brake pedal is greater than the fifth value, step S406 in the limiter cancel flag set processing shown in FIG. 3 makes the affirmative determination. Therefore, the program in FIG. 13 proceeds from step S406 to step S408 wherein limiter cancel flag $FG_{LC}$ is set at 1 ($FG_{LC}=1$) as shown in FIG. 18. With these arrangements of the fourth embodiment according to the present invention, when brake hydraulic pressure $P_{HYD}$ or stroke quantity BSTQ of the bake pedal according to the braking operation of the vehicle occupant is large, that is, when it is determined that the vehicle occupant intends to actively decelerate the host vehicle, controller 20 of the adaptive cruise control system inactivates limiter 52. Therefore, the host vehicle is smoothly decelerated without any limitation to target driving/braking force $F_{OR}$, and ensures a safety driving performance.

Figure 19:
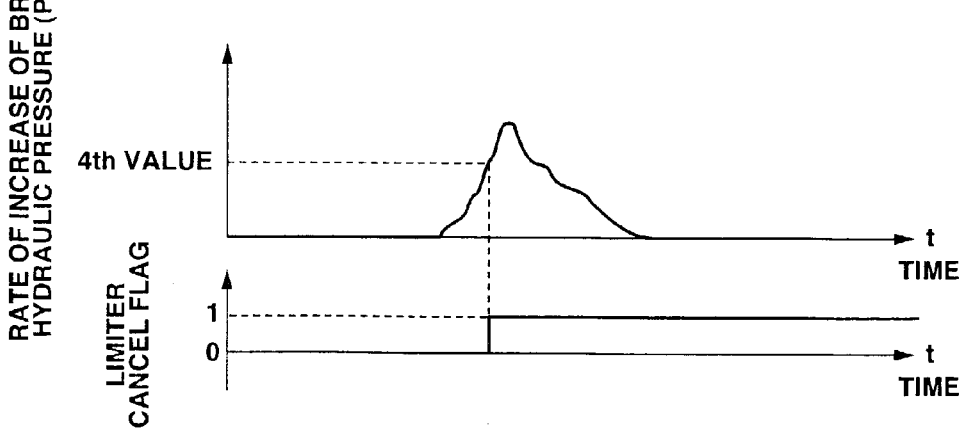
FIG. 19 is a graph showing an operation achieved according to an affirmative determination at step S405 in the flowchart of FIG. 13.
Figure 20:
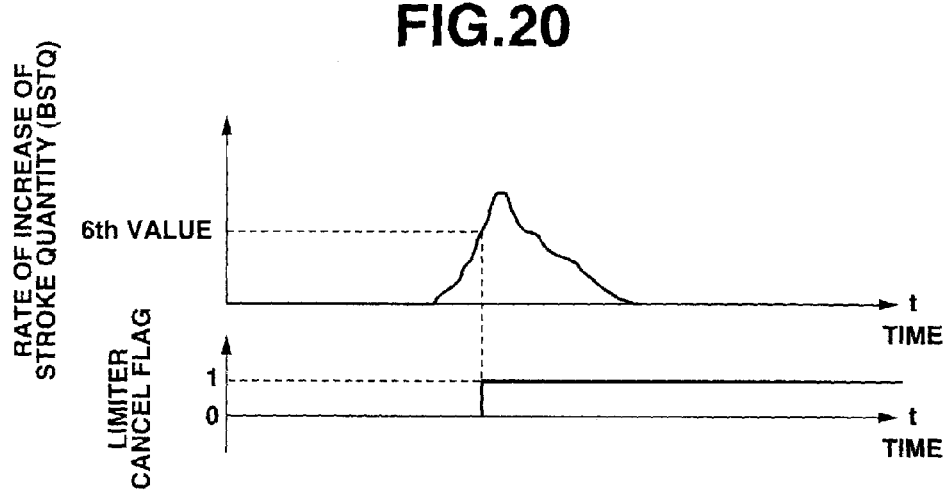
FIG. 20 is a graph showing an operation achieved according to an affirmative determination at step S407 in the flowchart of FIG. 13.

When the rate of increase of brake hydraulic pressure $P_{HYD}$ is greater than the fourth value due to a quick braking operation, step S405 in the limiter cancel flag set processing shown in FIG. 13 makes the affirmative determination. Therefore, the program in FIG. 13 proceeds from step S405 to step S408 wherein limiter cancel flag $FG_{LC}$ is set at 1 ($FG_{LC}=1$) as shown in FIG. 19. Similarly, when the rate of increase of stroke quantity BSTQ of the brake pedal is greater than the sixth value due to a quick braking operation, step S407 in the limiter cancel flag set processing shown in FIG. 13 makes the affirmative determination. Therefore, the program in FIG. 13 proceeds from step S407 to step S408 wherein limiter cancel flag $FG_{LC}$ is set at 1 ($FG_{LC}=1$) as shown in FIG. 20.

With these arrangements of the fourth embodiment according to the present invention, when the rate of increase of brake hydraulic pressure $P_{HYD}$ is greater than or equal to the fourth value or the rate of increase of stroke quantity BSTQ is greater than or equal to the sixth value, it is determined that the vehicle occupant intends to actively decelerate the host vehicle. Further, controller 20 of the adaptive cruise control system inactivates limiter 52 when the vehicle occupant intends to actively decelerate the host vehicle. Therefore, the host vehicle is smoothly decelerated without any limitation of target driving/braking force $F_{OR}$, and ensures a safety driving performance.

In the first through fourth embodiments according to the present invention, target vehicle speed calculating section 44 corresponds to target vehicle speed setting means. Vehicle speed control section 50 corresponds to target driving force setting means and approach tendency detecting means. Brake control system 8 and engine output system 9 correspond to driving force control means. Engine output control system 9 corresponds to driving force generating means. Inter-vehicle distance sensor 12 and relative speed calculating section 41 correspond to approaching state detecting means. Brake pedal stroke sensor 14 and brake hydraulic pressure sensor 15 correspond to brake demand detecting means. The data map shown in FIG. 5 corresponds to engine brake torque estimating means. The data map shown in FIG. 6 corresponds to running resistance estimating means. Acceleration sensor 60 corresponds to acceleration detecting means.

Although the first through fourth embodiments according to the present invention have been shown and described such that the vehicle speed calculating processing is provided in the form of the software and following controller 20 executes this software, it will be understood that the invention is not limited to this, and the vehicle speed calculating processing may be a hardware which is of an electronic circuit constructed by function generators, comparators, calculators and the like.

Further although the first through fourth embodiments according to the present invention have been shown and described so as to be adapted to a rear-wheel drive vehicle and to employ internal combustion engine 2 as a rotational driving source, it will be understood that the invention is not limited to this, and an electric motor may be employed as a rotation driving source, and the present invention may be adapted to a hybrid vehicle employing an internal combustion engine and an electric motor.

Although the second embodiment has been shown and described such that the running resistance is calculated on the basis of the host-vehicle speed Vs, the invention is not limited to this and may be determined upon taking account of other factors such as a gradient of a traveling road.

Figure 21:
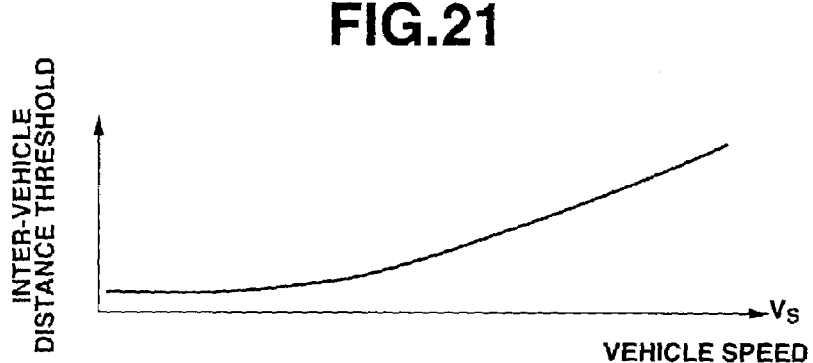
FIG. 21 is a graph showing a relationship between the host-vehicle speed and an inter-vehicle distance threshold, which is employed instead of the first value employed in step S402 in the flowchart of FIG. 13.

Further, although the fourth embodiment according to the present invention has been shown and described such that limiter cancel flag $FG_{LC}$ is set when inter-vehicle distance L between the host vehicle and the preceding vehicle is smaller than or equal to the first value such as 20 m, the invention may not be limited by this. For example, instead of the first value, an inter-vehicle distance threshold, which increases as host-vehicle speed Vs increases as shown in FIG. 21, may be employed, and the limiter cancel flag $FG_{LC}$ may be set at 1 ($FG_{LC}=1$) when inter-vehicle distance L between the host vehicle and the preceding vehicle is smaller than or equal to the inter-vehicle distance threshold.

This application is based on Japanese Patent Applications No. 2002-40638 filed on Feb. 18, 2002, and No. 2002-155908 filed on May 29, 2002 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An adaptive cruise control system for a host vehicle, comprising:
a controller configured
to set a target vehicle speed,
to set a target driving force on the basis of the target vehicle speed,
to control a driving force on the basis of the target driving force, and
to limit a magnitude of a rate of change of the target driving force within a first predetermined value when a direction of a wheel driving torque applied to driving wheels of the host vehicle is changed from one of an accelerating state for accelerating a rotation of the driving wheel and a decelerating state for decelerating the rotation of the driving wheels to the other of the accelerating state and the decelerating state.

2. The adaptive cruise control system as claimed in claim 1, wherein the controller is further configured to limit a magnitude of a rate of decrease of the target driving force within a second predetermined value when a direction of a wheel driving torque applied to driving wheels of the host vehicle is changed from an accelerating state for accelerating a rotation of the driving wheels to a decelerating state for decelerating the rotation of the driving wheels.

3. The adaptive cruise control system as claimed in claim 2, further comprising a preceding vehicle detector for detecting an approaching state between the host vehicle and a preceding vehicle ahead of the host vehicle, the controller being further configured to inactivate limiting the magnitude of the rate of change of the target driving force when the approaching state between the host vehicle and the preceding vehicle is within a predetermined state.

4. The adaptive cruise control system as claimed in claim 3, wherein the preceding vehicle detector includes an inter vehicle distance sensor for detecting an inter vehicle distance between the host vehicle and the preceding vehicle, the controller being further configured to cancel limiting the magnitude of the rate of change of the target driving force when the inter vehicle distance is smaller than or equal to a third predetermined value.

5. The adaptive cruise control system as claimed in claim 3, wherein the preceding vehicle detector includes a relative speed detector for detecting a relative speed between the host vehicle and the preceding vehicle and an approaching tendency detector for detecting a magnitude of an approaching tendency between the host vehicle and the preceding vehicle, the controller being further configured to cancel limiting the magnitude of the rate of decrease of the target driving force when the approaching tendency is greater than or equal to a fourth predetermined value.

6. The adaptive cruise control system as claimed in claim 2, further comprising a braking detector for detecting a magnitude of a braking demand of a vehicle occupant, the controller being further configured to cancel limiting the magnitude of the rate of decrease of the target driving force when the magnitude of the braking demand is greater than a fifth predetermined value.

7. The adaptive cruise control system as claimed in claim 1, wherein the controller is further configured to limit a magnitude of a rate of increase of the target driving force within a sixth predetermined value when a direction of a driving wheel torque applied to driving wheels of the host vehicle is changed from a decelerating direction for decelerating a rotation of the driving wheels to an accelerating direction for accelerating the rotation.

8. The adaptive cruise control system as claimed in claim 7, wherein the controller is further configured to estimate an engine brake driving wheel torque having a direction of decelerating the rotation of the driving wheels and to estimate a running resistance driving wheel torque having a direction of decelerating the rotation of the driving wheels, the controller being further configured to cancel limiting the magnitude of rate of change of the target driving force when the driving wheel torque due to the target driving force is greater than the sum of the engine brake driving wheel torque and the running resistance driving wheel torque.

9. The adaptive cruise control system as claimed in claim 7, further comprising an acceleration detector for detecting an acceleration of the host vehicle, the controller being further configured to cancel limiting the magnitude of rate of change of the target driving force when the acceleration is greater than a seventh predetermined value.

10. The adaptive cruise control system as claimed in claim 1, wherein the controller is further configured to limit a rate of increase of the target driving force within a seventh predetermined value when the controller determines that the rate of increase of the target driving force takes a value greater than the seventh predetermined value and during when a magnitude of the target driving force is smaller than a magnitude of a total of braking forces applied to the host vehicle.

11. The adaptive cruise control system as claimed in claim 10, wherein the controller is further configured to cancel limiting the rate of increase of the target driving force when the magnitude of the target driving force is greater than or equal to the magnitude of the total of braking forces applied to the host vehicle.

12. The adaptive cruise control system as claimed in claim 1, further comprising an acceleration detector for detecting an acceleration of the host vehicle, the controller being further configured to limit a rate of increase of the target driving force within a seventh predetermined value when the controller determines that the rate of increase of the target driving force takes a value greater than the seventh predetermined value and during when the acceleration is smaller than an eighth predetermined value.

13. The adaptive cruise control system as claimed in claim 12, wherein the controller is further configured to cancel limiting the rate of increase of the target driving force when the acceleration is greater than or equal to the eighth predetermined value.

14. An adaptive cruise control system for a host vehicle, comprising:
   a vehicle speed detector for detecting a host vehicle speed;
   an inter vehicle distance detector for detecting an inter vehicle distance between the host vehicle and a preceding vehicle ahead of the host vehicle; and
   a controller coupled to the inter vehicle distance detector and the vehicle speed detector, the controller being configured,
      to calculate a target vehicle speed on the basis of the host vehicle speed and the inter vehicle distance,
      to calculate a target driving force on the basis of the target vehicle speed,
      to control a driving force on the basis of the target driving force, and
      to limit a magnitude of a rate of change of the target driving force within a first predetermined value when a direction of a wheel driving torque applied to driving wheels of the host vehicle is changed from one of an accelerating state for accelerating a rotation of the driving wheel and a decelerating state for decelerating the rotation of the driving wheels to the other of the accelerating state and the decelerating state.

15. A method of executing an adaptive cruise control system for a host vehicle, the method comprising:
   setting a target vehicle speed;
   setting a target driving force on the basis of the target vehicle speed;
   controlling a driving force on the basis of the target driving force; and
   limiting a magnitude of a rate of change of the target driving force within a first predetermined value when a direction of a wheel driving torque applied to driving wheels of the host vehicle is changed from one of an accelerating state for accelerating a rotation of the driving wheel and a decelerating state for decelerating the rotation of the driving wheels to the other of the accelerating state and the decelerating state.

16. An adaptive cruise control system for a host vehicle, comprising:
   target vehicle speed setting means for setting a target vehicle speed;
   target driving force setting means for setting a target driving force on the basis of the target vehicle speed;
   driving force controlling means for control a driving force on the basis of the target driving force, and
   limit means for limiting a magnitude of a rate of change of the target driving force within a first predetermined value when a direction of a wheel driving torque applied to driving wheels of the host vehicle is changed from one of an accelerating state for accelerating a rotation of the driving wheel and a decelerating state for decelerating the rotation of the driving wheels to the other of the accelerating state and the decelerating state.

* * * * *